(12) United States Patent
Gundtoft

(10) Patent No.: US 8,453,473 B2
(45) Date of Patent: Jun. 4, 2013

(54) ARRANGEMENT FOR COOLING OF AN ELECTRICAL MACHINE

(75) Inventor: Soeren Gundtoft, Fredericia (DK)

(73) Assignee: Siemens Aktiengesellschaft, München (DE)

( * ) Notice: Subject to any disclaimer, the term of this patent is extended or adjusted under 35 U.S.C. 154(b) by 875 days.

(21) Appl. No.: 12/606,363

(22) Filed: Oct. 27, 2009

(65) Prior Publication Data

US 2010/0102653 A1    Apr. 29, 2010

(30) Foreign Application Priority Data

Oct. 28, 2008 (EP) ..................................... 08018799

(51) Int. Cl.
*F25D 23/12* (2006.01)
(52) U.S. Cl.
USPC ......................................................... 62/259.2

(58) Field of Classification Search
USPC ... 62/259.2, 498; 165/104.19, 104.33; 310/54
See application file for complete search history.

(56) References Cited

U.S. PATENT DOCUMENTS

| | | |
|---|---|---|
| 5,974,817 A | 11/1999 | Prummer |
| 6,330,809 B1 | 12/2001 | Boardman, IV et al. |
| 2005/0150410 A1 | 7/2005 | Haas et al. |

FOREIGN PATENT DOCUMENTS

JP            10300265 A    11/1998

*Primary Examiner* — Melvin Jones

(57) ABSTRACT

An arrangement for cooling an electrical machine is provided. The electrical machine is connected with a first cooling-system which directly cools the electrical machine. The first cooling-system circulates a first cooling-medium. The first cooling-system is connected with a second cooling-system which delivers heat from the first cooling-system to the second cooling-system. The second cooling-system circulates a second cooling-medium to remove the received heat. The first cooling-system is connected with a third cooling-system, which is a refrigeration-system, to additionally cool down the first cooling-medium of the first cooling-system.

17 Claims, 2 Drawing Sheets

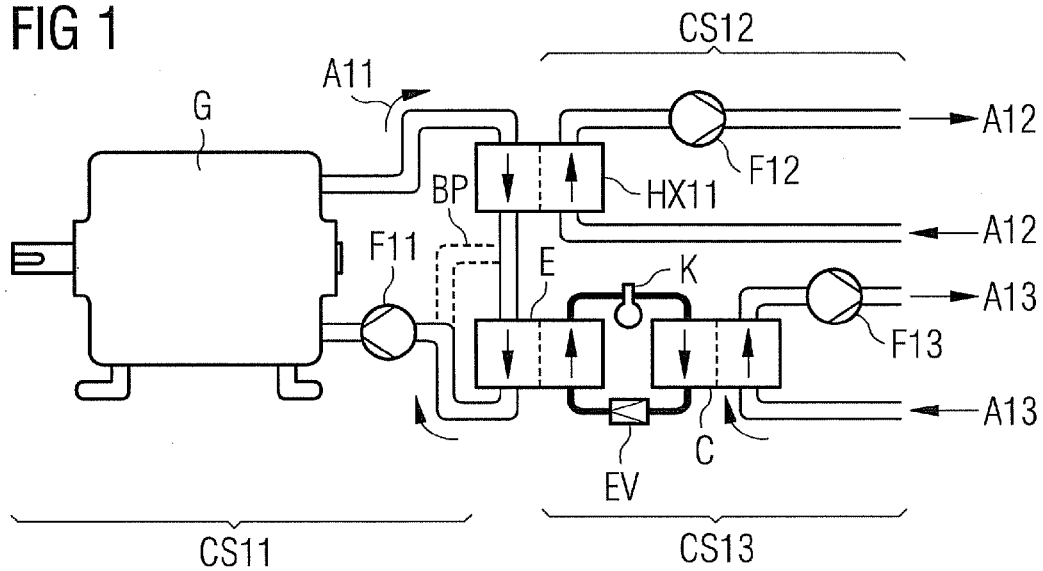
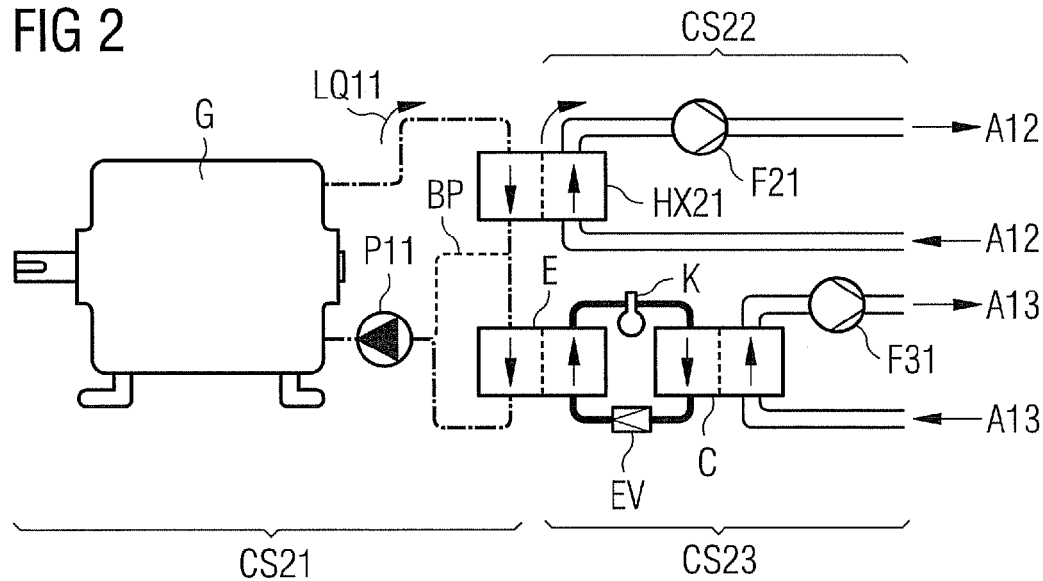

Symbols:  ——— air
          —·—·— liquid
          ▬▬▬ refrigerant

ARRANGEMENT FOR COOLING OF AN ELECTRICAL MACHINE

CROSS REFERENCE TO RELATED APPLICATIONS

This application claims priority of European Patent Office application No. 08018799.0 EP filed Oct. 28, 2008, which is incorporated by reference herein in its entirety.

FIELD OF INVENTION

The invention relates to a cooling-arrangement of an electrical machine.

In a preferred embodiment the invention relates to a huge electrical machine, which is totally enclosed by a shell or housing.

BACKGROUND OF INVENTION

Electrical machines needs cooling to dissipate heat, which is generated during its operation by ohmic resistance, by iron hysteresis, etc.

It is possible to cool a small electrical machine by a heat-transfer from the inside of the machine to its surface.

This is not possible for a large machine, which shows a relatively small surface per power rating and heat generation.

When a machine is installed indoor at a dry atmosphere it is possible to operate the machine without a housing, so a cooling is achieved by the circulation of ambient air through the machine.

When the machine is installed under harsh conditions, like it is for generators being used in offshore wind-turbines, the electrical machine need to be totally enclosed, so ambient air is not allowed to circulate through the machine. For this application dedicated cooling-systems are required.

One very common cooling-method is the circulation of air or another gaseous medium inside the electrical machine, while the cooling-medium is kept cool by a heat-exchanger. This cooling method disadvantageously requires large gas-to-air or gas-to-water heat-exchangers. Furthermore considerable additional power is required to circulate the cooling-medium inside the machine.

Another cooling-method of a generator, which shows a stator and a rotor, is the circulation of a liquid on a first side of the stator. This first side to be cooled is opposite to an air gap, which is between the stator and the rotor. The stator shows a number of stacked laminate-plates, which carries metal-windings of stator-coils, so the heat is transferred from the metal-windings through the laminate-plates to the cooling-medium by conduction.

This cooling method suffers from a considerable temperature-gradient, which exists between the windings of the stator and the cooling-medium—due to a moderate heat-conductivity of the laminate-plates. Because of this it is difficulty to maintain a predetermined winding-temperature, which is below a required maximum-value.

Another cooling-method is to bring in liquid or gas for cooling-purposes into slots of the laminate-plates, while these slots are used to carry the metal-windings. To bring in the cooling-medium hollow ceramic-cooling-pipes are used, which are expensive and difficulty to handle.

FIG. 3 to FIG. 5 shows state-of-the-art arrangements for cooling of a generator G, which may be used inside a nacelle of a wind-turbine.

Referring to FIG. 3 the generator G is cooled by normal air A. The cooling-air A is forced to flow through the generator G by help of a fan F and is used inside the generator G for cooling-purposes. The heated air A is leaving the generator G later.

Referring to FIG. 4 the generator G is cooled by air A1, which is forced to flow through the generator G by help of a fan F1.

It is not possible for offshore-locations to use ambient air for the cooling as described in FIG. 3 as ambient air comprises salt-particles.

Therefore a closed system is used to circulate the cooling-air A1 to and from the generator G, while a heat-exchanger HX is used to hand-over the heat from the cooling air A1 to another cooling-system, which also uses air A2 for the transport of heat.

The air A2 of this second cooling-system is forced to flow to and from the heat-exchanger HX by help of a fan F2.

The cooling air A1 is separated from an ambient air A2 by help of the heat exchanger HX, which is a air-to-air heat-exchanger. This results as described in two needed fans F1 and F2.

Referring to FIG. 5 the generator G is cooled by a normal liquid LQ. The cooling liquid LQ is forced to flow through the generator G by help of a pump P.

The cooling liquid LQ is cooled by ambient air A3 by help of a heat-exchanger HX, which transfers the heat to circulated ambient air A3.

The air A3 is forced to flow to and from the heat-exchanger HX by help of a fan F3.

The benefit of the liquid cooling system as shown in FIG. 5 is a higher capacity in intensive cooling of the generator G and furthermore, the generator G is separated from a salty ambient air, comparable to FIG. 4.

For new electrical machines (i.e. as motors and generators) an external magnetising system is replaced by permanent magnets. For these types it is essential to keep the temperatures of the magnets low to achieve a high capacity and efficiency.

There are two basic physical constraints, which must be taking into account to achieve a high cooling capacity—the used cooling-medium as liquid or gas has to show a high speed while passing hot-spots for an efficient cooling. Additionally or alternatively the used cooling-medium has to show a low temperature for an efficient cooling.

To circulate the cooling-medium with high speed induces a high power-consumption needed by pumps of fans, so an overall efficiency of the electrical machine is reduced. Furthermore a high speed circulating cooling-medium may induce unacceptable noise.

There is one problem remaining: if the electrical machine is located at hot sites as deserts it is not possible to cool down the medium to a temperature, which is below the ambient temperature. Additionally if the cooling-medium needs to be cooled down close to the ambient temperature then the size of required heat-exchangers has to grow dramatically.

This relationship is not linear: the size is to a certain extend proportional to the "inverse of the temperature difference"— in this case:

$A = K \times 1/dT$, where

A is a property for the dimension of the heat exchanger—for example the surface area, K is a constant-value, and dT is the difference between the temperature of the cooled-down medium and the ambient-temperature.

SUMMARY OF INVENTION

It is the aim of the present invention, to provide an improved arrangement for cooling of an electrical machine, especially to be used at hot sites.

This aim is solved by the features of the claims. Preferred embodiments of the invention are described within the dependant claims.

The inventive arrangement for cooling of an electrical machine comprises two cooling-systems as described as follows.

The electrical machine is connected with a first cooling-system for its direct cooling, while the first cooling-system circulates a first cooling-medium. The first cooling-system is connected with a second cooling-system to hand-over heat from the first cooling-system to the second cooling-system. The second cooling-system circulates a second cooling-medium to remove the received heat. The first cooling-system is connected with a third cooling-system to additionally cool down the first cooling-medium of the first cooling-system.

The third cooling-system might be any type of refrigeration-system.

So the third cooling-system might be a refrigeration-system of the vapor-compression refrigeration type, which comprises an evaporator. The evaporator is used to connect the first and the third cooling-system.

The third cooling-system might be a compression-cooling-system or an absorption-cooling-system or a magnetic-cooling-system or even a Peltier-cooling-system—all of them using their cold "heat sink" to cool down the cooling-medium of the first cooling-system.

So according to the invention a third cooling-system as described above is brought additionally to an existing cooling-system to enhance the cooling capacity of the whole electrical machine.

So if it is necessary, it is possible, to enhance the cooling capacity of a dedicated electrical machine by retrofitting with the third refrigeration-system. This system acts as a so called "retro-fit".

Especially if a site, where the electrical machine is located, is a very hot site, the third system allows to deal with high ambient temperatures. So in this case the third system may be introduced from the beginning or by retrofitting if it is necessary.

The cooling-arrangement according to the invention allows to cool down active parts, which are located inside the electrical machine, to a temperature that is below the ambient temperature.

This results in a higher capacity of the active parts. Especially if the electrical machine is a generator or motor it is possible to reduce the amount of copper and magnets for a given size of the generator or motor. This leads directly to reduced costs, as copper is an expensive part of the machine.

As the amount of used copper and magnets is reduced, it is possible to reduce the size of the generator or motor, too.

Furthermore the high cooling-capacity per volume of the generator or motor leads to a reduced size of the generator or motor.

The inventive arrangement for cooling might be implemented as additional feature of the generator or motor, which is able to be refitted to already existing machines. So the resulting, whole cooling system of the electrical machine can be adjusted later as an optional solution, which only needs to be applied for hot sites.

BRIEF DESCRIPTION OF THE DRAWINGS

The invention will be described in more detail by help of some figures, while:

FIG. 1 shows a first embodiment of the inventive cooling-arrangement,

FIG. 2 shows a second embodiment of the inventive cooling-arrangement, and

DETAILED DESCRIPTION OF INVENTION

Figure 3:
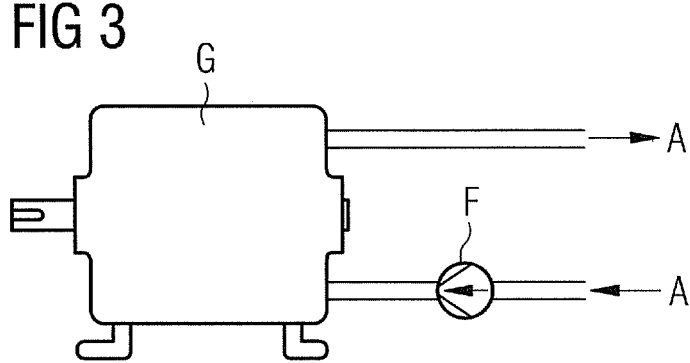
FIG. 3 to FIG. 5 show state-of-the-art cooling-arrangements as described above.
Figure 4:
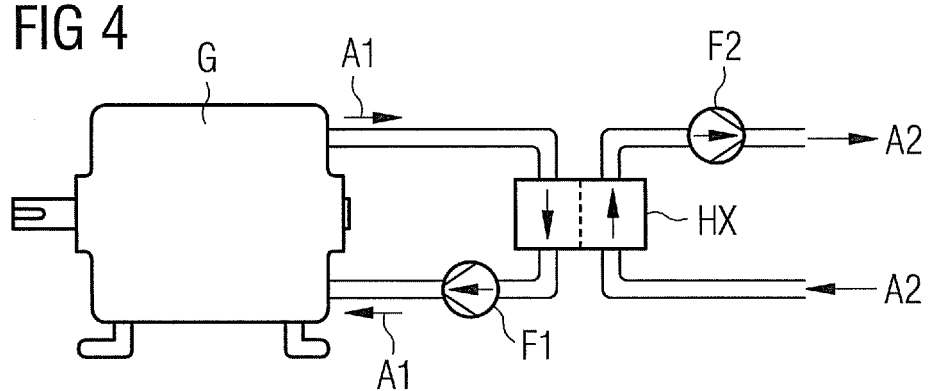
Figure 5:
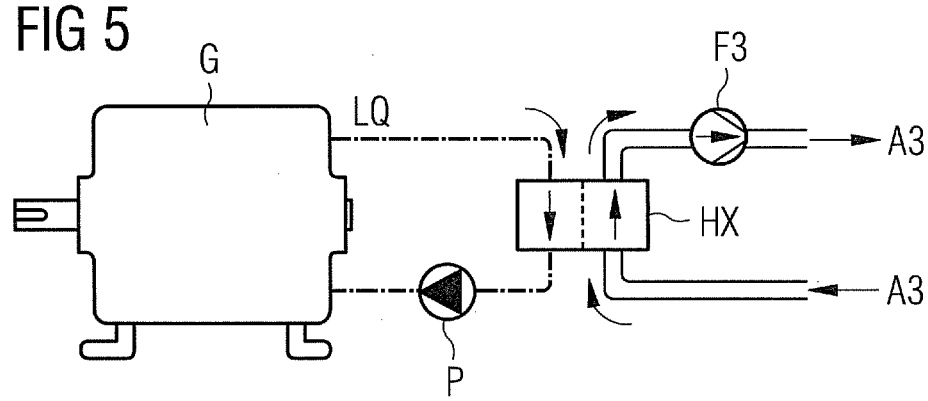

FIG. 1 shows a first embodiment of the inventive cooling-arrangement, which is based on an air-cooled generator G.

The generator G is located offshore and/or at hot sites in a nacelle of a wind-turbine in a preferred embodiment.

There is a first cooling system CS11, which is connected with the generator G for its direct cooling. This first cooling-system CS11 comprises a fan F11 to enforce the flow of cooling-air A11 through the generator G.

There is a second cooling system CS12 with a fan F12. Ambient air A12 is forced to flow through the second cooling-system CS12 by help of a fan F12.

The second cooling system CS12 is connected with the first cooling-system CS11 via an air-to-air heat-exchanger HX11. The heat-exchanger HX11 is used to hand-over dissipated heat from the cooling-air A11 to the ambient air A12.

According to the invention there is a third cooling-system CS13, which is a refrigeration-system. The third-cooling-system CS13 is connected with the first cooling-system CS11 via an evaporator E if the refrigeration system is a vapor-compression system.

Because of this the pre-cooled air A11 of the first cooling-circuit C11 is cooled-down additionally by the third-cooling-system CS13.

If the third cooling-system CS13 is a vapor-compression system it comprises standard components: the evaporator E, a compressor K, a condenser C and an expansion valve EV. The heat is brought to a used cooling-liquid by help of the evaporator E and is brought to the ambient via the air-cooled condenser C. Ambient air A13 is forced to flow through the condenser C by help of a fan F13.

In a preferred embodiment there is a bypass BP, which passes parts of the cooling-air A11 over the evaporator E.

It is also possible, to use a liquid-cooled condenser C, especially if the generator G is located offshore. In this case a lot of cold cooling-water could be used for cooling-purposes.

FIG. 2 shows a second embodiment of the inventive cooling-arrangement, which is based on a liquid-cooled generator.

The generator G is located offshore and/or at hot sites in a nacelle of a wind-turbine in a preferred embodiment.

There is a first cooling system CS21, which is connected with the generator G for its direct cooling. This first cooling-system CS21 comprises a pump P11 to enforce the flow of a cooling-liquid LQ11 through the generator G.

There is a second cooling system CS22 with a fan F21. Ambient air A12 is forced to flow through the second cooling-system CS22 by help of the fan F21.

The second cooling system CS22 is connected with the first cooling-system CS21 via a liquid-to-air heat-exchanger HX21. The heat-exchanger HX21 is used to hand-over dissipated heat from the cooling liquid LQ11 to the ambient air A12.

According to the invention there is a third cooling-system CS23, which is a refrigeration-system. The third-cooling-system CS23 is connected with the first cooling-system CS21 via an evaporator E if the refrigeration system is a vaporcompression refrigeration system.

Because of this the pre-cooled liquid LQ11 of the first cooling-circuit C21 is cooled-down additionally by the third-cooling-system CS23.

If the third cooling-system CS23 is a vapor-compression refrigeration system, it comprises standard components: the evaporator E, a compressor K, a condenser C and an expansion valve EV. The heat is brought to a used cooling-liquid by help of the evaporator E and is brought to the ambient via the air-cooled condenser C. Ambient air A13 is forced to flow through the condenser C by help of a fan F31.

In a preferred embodiment there is a bypass BP, which passes parts of the cooling-liquid LQ11 over the evaporator E or over the cold heat sink if other refrigeration systems than vapor-compression systems are used.

It is also possible, to use a liquid-cooled condenser C, especially if the generator G is located offshore. In this case a lot of cold cooling-water could be used for cooling-purposes.

The refrigeration system as described in FIG. 1 and FIG. 2 are shown as "standard one-step refrigeration system".

It is also possible, to use other types of refrigeration systems like two-step-systems, absorption cooling-systems, etc.

The invention claimed is:

1. An arrangement for the cooling of an electrical machine, comprising:
    a first cooling-system connected to the electrical machine, the first cooling-system directly cools the electrical machine;
    a second cooling-system connected to the first cooling system; and
    a third cooling-system connected to the first cooling system,
    wherein the first cooling-system circulates a first cooling-medium,
    wherein the first cooling-system delivers heat to the second cooling-system, while the second cooling-system circulates a second cooling-medium to remove the received heat, and
    wherein a third cooling-system which is a refrigeration-system additionally cools down the first cooling-medium,
    wherein the third cooling-system is a vapor-compression refrigeration-system,
    wherein the third cooling-system comprises an evaporator, and
    wherein the evaporator is used to connect the first cooling-system with the third cooling-system,
    wherein the third cooling-system comprises the evaporator, a compressor, a condenser which is air-cooled or water-cooled, and an expansion valve, and
    wherein heat is transferred to a used cooling-liquid by the evaporator and then transferred to the third flow of ambient air via the condenser.

2. The arrangement as claimed in claim 1, wherein the third cooling-system is selected from the group consisting of an absorption-cooling-system, a magnetic-cooling-system, and a Peltier-cooling-system.

3. The arrangement as claimed in claim 1, wherein the first cooling system comprises a first fan to enforce a first flow of cooling-air through a generator.

4. The arrangement as claimed in claim 1, wherein the first cooling system further comprises a pump to enforce a second flow of a cooling-liquid through the generator.

5. The arrangement as claimed in claim 1, wherein the second cooling-system comprises a second fan to enforce a third flow of ambient air through the second cooling-system.

6. The arrangement as claimed in claim 1,
    wherein the first cooling-system further comprises a bypass, and
    wherein the bypass is used so that the first flow or the second flow can bypass the third-cooling-system.

7. The arrangement as claimed in claim 1, wherein the electrical machine is a generator.

8. The arrangement as claimed in claim 7, wherein the generator is located inside a nacelle of a wind-turbine.

9. The arrangement as claimed in claim 1, wherein the electrical machine is located offshore.

10. The arrangement as claimed in claim 1, wherein the electrical machine is located at a hot site.

11. The arrangement as claimed in claim 1, wherein the electrical machine is located offshore and/or at a hot site.

12. The arrangement as claimed in claim 1, wherein an existing system with the first cooling-system and the second cooling-system is retro-fit with the third cooling-system.

13. The arrangement as claimed in claim 1, wherein the third cooling-system is a two-step refrigeration system.

14. The arrangement as claimed in claim 1, wherein the third cooling-system is an absorption cooling-system.

15. The arrangement as claimed in claim 1, wherein the first cooling-system is connected with the second cooling-system via a heat-exchanger.

16. The arrangement as claimed in claim 15, wherein the heat-exchanger is an air-to-air heat-exchanger.

17. The arrangement as claimed in claim 15, wherein the heat-exchanger is a liquid-to-air heat-exchanger.

* * * * *